United States Patent [19]
Ohmamyuda et al.

[11] Patent Number: 5,257,173
[45] Date of Patent: Oct. 26, 1993

[54] LIGHT IRRADIATING APPARATUS HAVING LIGHT EMITTING DIODE USED AS LIGHT SOURCE

[75] Inventors: Yukio Ohmamyuda, Sagamihara; Shigeru Kimura, Yokohama; Toru Tanabe, Machida; Kazuhisa Iwasaki, Yokohama; Takao Seto, Yokohama; Hideki Kitamura, Yokohama; Kazuhiko Sugimura, Yokohama; Yasushi Senoo, Yokohama, all of Japan

[73] Assignee: Stanley Electric Co., Ltd., Tokyo, Japan

[21] Appl. No.: 801,943

[22] Filed: Dec. 3, 1991

[30] Foreign Application Priority Data

| Dec. 7, 1990 | [JP] | Japan | 2-401774 |
| Dec. 17, 1990 | [JP] | Japan | 2-403505 |
| Dec. 17, 1990 | [JP] | Japan | 2-403506 |
| Dec. 21, 1990 | [JP] | Japan | 2-404101 |
| Dec. 22, 1990 | [JP] | Japan | 2-404364 |

[51] Int. Cl.⁵ ............................................. F21V 5/04
[52] U.S. Cl. ................................. 362/235; 362/251; 362/252; 362/800
[58] Field of Search ............... 362/32, 235, 251, 252, 362/800; 385/31, 33, 39, 115, 117, 119

[56] References Cited

U.S. PATENT DOCUMENTS

| 1,636,141 | 7/1927 | Mammen | 362/252 |
| 2,286,014 | 6/1942 | Rowe | 362/32 |
| 2,589,569 | 3/1952 | Peter et al. | 362/32 |
| 3,437,803 | 4/1969 | Ernst-Otto Seitz et al. | 385/117 |
| 3,513,306 | 5/1970 | Le Vantine | 362/235 |
| 3,825,336 | 7/1974 | Reynolds | 385/119 |
| 4,027,945 | 6/1977 | Iverson | 385/115 |
| 4,039,250 | 8/1977 | Gaertner | 385/31 |
| 4,185,888 | 1/1980 | Quelle, Jr. | 385/115 |
| 4,272,156 | 6/1981 | Ishibashi et al. | 385/117 |
| 4,355,863 | 10/1982 | Aulich et al. | 385/39 |
| 4,380,791 | 4/1983 | Nishizawa | 362/32 |
| 4,403,273 | 9/1983 | Nishioka | 385/117 |
| 4,577,926 | 3/1986 | Dewey et al. | 385/119 |
| 4,610,513 | 9/1986 | Nishioka et al. | 385/119 |
| 4,699,452 | 10/1987 | Mollenauer et al. | 385/39 |
| 4,729,076 | 3/1988 | Masami et al. | 362/235 |
| 4,746,185 | 5/1988 | Shahidi-Hamedani | 385/39 |
| 4,770,482 | 9/1988 | Sweeney et al. | 385/115 |
| 4,865,417 | 9/1989 | Naohiro et al. | 385/31 |
| 4,914,747 | 4/1990 | Nino | 362/61 |
| 5,036,248 | 7/1991 | McEwan et al. | 362/800 |

FOREIGN PATENT DOCUMENTS

| 0165181 | 6/1989 | Japan | 385/39 |

OTHER PUBLICATIONS

Hecht, "Optics", 1974, pp. 100–105, Addison-Wesley Pub. Co.

Primary Examiner—Albert J. Makay
Assistant Examiner—Alan B. Cariaso
Attorney, Agent, or Firm—Frishauf, Holtz, Goodman & Woodward

[57] ABSTRACT

A light source is constituted by a plurality of light emitting units which are arranged opposite to a light irradiating lens such that light emission from a part of the light source is changed to light emission from the whole surface of the light source and vice versa. In addition, a light irradiating apparatus having a light emitting diode used therefor as a light source comprises optical fiber(s) arranged between the light emitting diode and a light emitting lens such that a light emitted from the light emitting diode can be conducted to the light irradiating lens is disclosed. One end of each optical fiber is located at the position in the vicinity of the light emitting diode and other end of the same is located at the position substantially coincident with the focus of the light irradiating lens. In another embodiment, an optical fiber employable for an optical radar system has an outlet end of the optical fiber which is formed by two inclined surfaces in a wedge-shaped configuration. An inlet end of the optical fiber is formed at a right angle relative to an optical axis of the optical fiber.

6 Claims, 9 Drawing Sheets

LIGHT IRRADIATING APPARATUS HAVING LIGHT EMITTING DIODE USED AS LIGHT SOURCE

BACKGROUND OF THE INVENTION

1. Field of the Invention

The present invention relates generally to a light irradiating apparatus. More particularly, the present invention relates to a light irradiating apparatus having light emitting diode(s) used therefor as a light source for projecting a substantially parallel light onto a screen or the like. In addition, the present invention relates to a light source preferably employable for an optical radar system. Additionally, the present invention relates to an optical fiber preferably employable for the optical radar system.

2. Description of the Related Art

To facilitate understanding of the present invention, a conventional optical radar system as well as a conventional light irradiating apparatus having a light emitting diode used therefor as a light source will briefly be described below with reference to FIG. 15 to FIG. 17.

Figure 15:
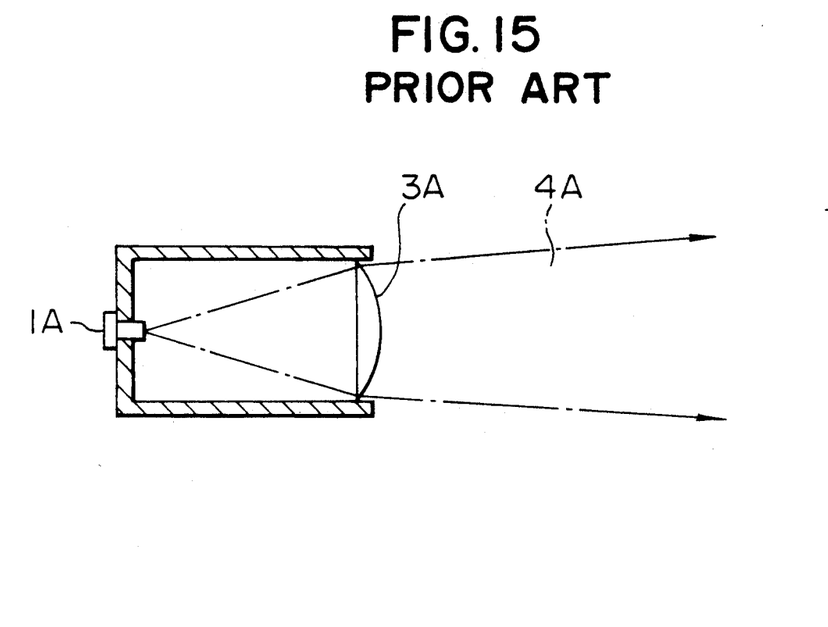
FIG. 15 is a schematic side view of a conventional optical radar system for a measuring a distance between two motorcars running one after another.

FIG. 15 is a schematic side sectional view of a conventional light emitting unit for use in an optical radar system which has been developed as an apparatus for measuring a distance from a motorcar running ahead of a rear motorcar. In the drawing, reference numeral 1A designates a light source, reference numeral 3A designates a light irradiating lens and reference numeral 4A designates an emitted light.

Usually, the light source 1A having a certain small surface is arranged at the position coincident with the focus of the light irradiating lens 3A. Thus, the light outputted from the light source 1A becomes an emitted light 4A which propagates while gradually radially expanding after it has passed through the light irradiating lens 3A. When the motorcar running ahead of the rear motorcar is located remote from the rear motorcar, the emitted light 4A sufficiently radially expands during its propagation, whereby a reflective plate mounted on the rear part of the motorcar running ahead of the rear motorcar is reliably illuminated with the emitted light 4A. With the conventional optical radar system constructed in the above-described manner, the motorcar running ahead of the rear motorcar can visually be recognized by a driver on the rear motorcar, and moreover, a distance between both the motorcars can be measured with excellent accuracy by measuring the time that elapses from the point of time, when the light is reflected at the reflective plate until the point of time when the reflected light returns to the rear motorcar, by using suitable measuring means mounted on the rear motorcar.

However, when the distance between both the motorcars is short, the emitted light 4A hardly expands in the radial direction. For this reason, there arises an occasion that the reflective plate on the motorcar running ahead of the rear motorcar is not illuminated with the emitted light 4A, depending on the positional relationship between both the motorcars. It is obvious that the motorcar running ahead of the rear motorcar fails to be visually recognized by the driver in the rear motorcar and the distance between both the motorcars can not be measured by any means.

Figure 16:
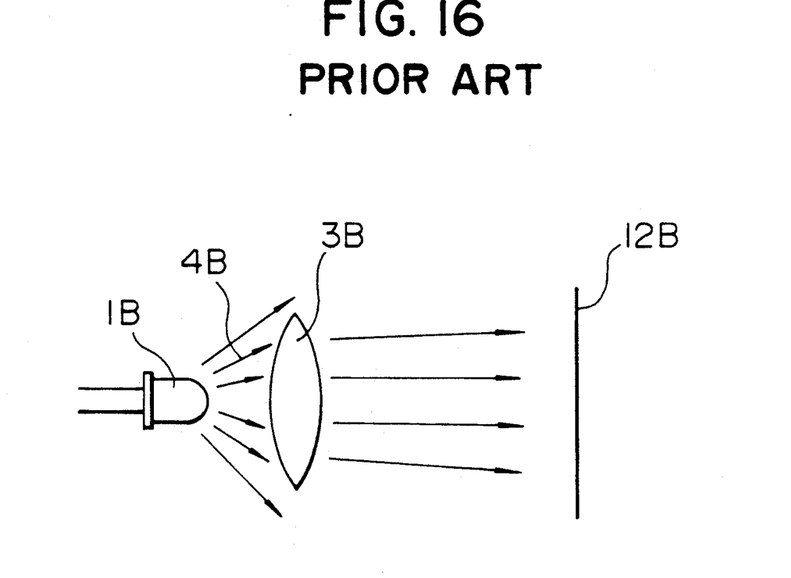
FIG. 16 is a schematic side view of a conventional LED light irradiating apparatus using a light emitting diode as a light source.

FIG. 16 is a schematic side view of a conventional light emitting apparatus having a light emitting diode used therefor as a light source (hereinafter referred to simply as a LED light emitting apparatus) for projecting a substantially parallel light onto a screen or the like. In the drawing, reference numeral 1B designates a LED light source, reference numeral 3B designates a light irradiating lens, reference numeral 4B designates an emitted light and reference numeral 12B designates a screen.

With respect to the LED light source 1B for emitting a light from the whole surface thereof, a difference in optical intensity of the emitted light 4B arises depending on the positions where wire bonding portions and tip end portions are arranged. For this reason, even when the emitted light beam 4B outputted from the LED light source 1B is transformed into a substantially parallel light via the light irradiating lens 3B, the light 4B having a fluctuation in optical intensity thereof is projected onto the screen 12B or the like while it is adversely affected by a pattern of emission of the light 4B from the LED light source 1B. In addition, since the LED light source 1B has a large light emission angle, an optical system associated with the light irradiating lens 3B becomes unavoidably complicated in structure when the emitted light 4B is intended to be transformed into a substantially parallel light at a high optical efficiency.

Figure 17:
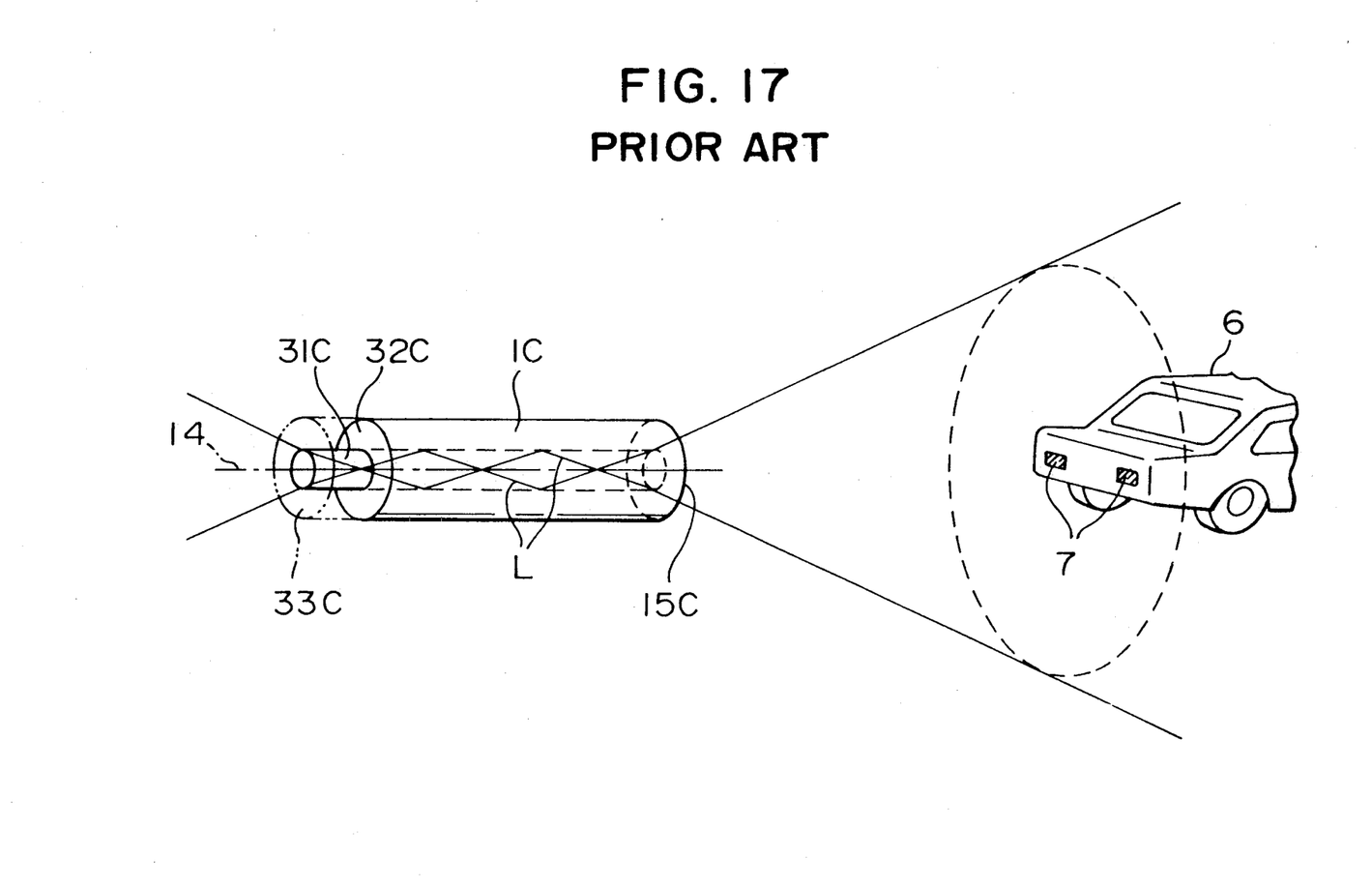
FIG. 17 schematically illustrates a conventional optical fiber preferably employable for an optical radar system.

FIG. 17 is a schematic side view of a conventional optical radar system for which a conventional optical fiber is used. The optical fiber 1C is basically constructed by a core portion 31C having a relatively large refractive index and a peripheral clad portion 32C having a relatively small refractive index, and the light L introduced into the optical fiber 1C via an inlet port 33C linearly propagates through the core portion 31C in parallel with an optical axis 14 of the optical fiber 1C or propagates therethrough while repeatedly being reflected along the full length of the boundary between the core portion 31C and the clad portion 32C to reach an outlet port 15C. Thereafter, the light L is irradiated from the outlet port 15C formed at a right angle relative to the optical axis 14 of the optical fiber 1C to the outside while expanding conically.

An angle with which the light L can be irradiated from the outlet port 15C of the optical fiber 1C is determined depending on the reflective index of the core portion 31C, the refractive index of the clad portion 32C or the like. Since the light L is conically irradiated at any rate, when the optical fiber 1C is used for an optical radar system, a motorcar 6 running ahead of a rear motorcar (not shown) is illuminated with a circular pattern so that a reflective plate 7 mounted on the rear part of the motorcar 6 is reliably illuminated with the conically expanded irradiated light.

While the motorcar 6 runs in the forward direction on the road surface, it is necessary that the light L is irradiated with a large angle as seen in the leftward/rightward direction but it is not necessary that the light L is irradiated with a large angle as seen in the upward/downward direction. In other words, a part of the light L excessively irradiated in the upward/downward direction becomes useless. This leads to a problem that a quantity of the light irradiated to the reflective plate 7 on the motorcar 6 to illuminate the same becomes low.

In view of the foregoing problem, there have been hitherto raised many requests for providing a LED light irradiating apparatus which assures that a light can be emitted from a LED light source with uniform optical intensity of the emitted light but without fluctuation of distribution of the optical intensity of the same attributable to a pattern of emission of the light from the LED light source.

SUMMARY OF THE INVENTION

The present invention has been made with the aforementioned background in mind.

An object of the present invention is to provide a light source which assures that light emission from a part of the light source can be changed to light emission from the whole surface of the light source, and vice versa.

Other object of the present invention is to provide a light irradiating apparatus having light emitting diode(s) used therefor as a light source which assures that a light can be emitted from the light source with uniform optical intensity of irradiated light while the emitted light is transformed into a parallel light.

Another object of the present invention is to provide an optical fiber preferably employable for an optical radar system.

According to a first aspect of the present invention, there is provided a light source constituted by a plurality of light emitting units, wherein the light emitting units are arranged opposite to a light irradiating lens such that light emission from a part of the light source can be changed to light emission from the whole surface of the light source, and vice versa.

According to a second aspect of the present invention, there is provided a light irradiating apparatus having a light emitting diode used therefor as a light source, wherein an optical fiber is laid between the light emitting diode and a light irradiating lens such that a light emitted from the light emitting diode can be conducted to the light irradiating lens.

According to a third aspect of the present invention, there is provided a light irradiating apparatus having a light emitting diode used therefor as a light source, wherein a plurality of optical fibers are laid between the light emitting diode and a light irradiating lens such that a light emitted from the light emitting diode can be conducted to the light irradiating lens.

With the light irradiating apparatus constructed in the above-described manner, one end of each optical fiber is located at the position in the vicinity of the light emitting diode and other end of the same is located at the position substantially coincident with the focus of the light irradiating lens.

It is preferable that the optical fibers are arranged in a laminated structure such that they do no intersect each other.

Alternatively, the optical fibers may be arranged in an eddy current-shaped configuration such that they intersect each other.

According to a fourth aspect of the present invention, there is provided a light irradiating apparatus having a plurality of light emitting diodes used therefor as a light source, wherein an optical fiber is divided into a plurality of optical fiber portions each having an inlet port at the foremost end thereof, each of the light emitting diodes being located opposite to the inlet port of each of the optical fiber portions.

With the light irradiating apparatus constructed as described above, the optical fiber has a single outlet port which is located opposite to a light irradiating lens.

Since the emitted lights from the LED light sources are introduced into the optical fiber portions via the plural inlet ports thereof and propagate through the optical fiber to reach the single outlet port, a quantity of the irradiated lights at the outlet port is increased substantially.

According to a fifth aspect of the present invention, there is provided an optical fiber preferably employable for an optical radar system, wherein an outlet end of the optical fiber is formed by two inclined surfaces in a wedge-shaped configuration.

On the other hand, an inlet port of the optical fiber is formed at a right angle relative to an optical axis of the optical fiber.

With the light source constructed in accordance with the first aspect of the present invention, since the emitted light outputted from the light source located at the position coincident with the focus of the light irradiating lens when all the light emitting units are simultaneously activated with a large working surface includes a light component comparative largely deviated from the optical axis of the light source, it becomes a wide beam having remarkably large radial expansion. On the contrary, when the emitted light outputted only from the central light emitting unit with a small working surface, the emitted light becomes a narrow beam having small radial expansion. Therefore, it is recommendable that when a distance between two motorcars running one after another is long, the narrow beam is selectively used but when the distance therebetween is short, the wide beam is selectively used. Since sufficiently large radial expansion is achieved until the narrow beam reaches the motorcar located remote from the rear motorcar, a reflective plate mounted on the motorcar running ahead of the rear motorcar can reliably be illuminated with the narrow beam.

With the LED light irradiating apparatus constructed in accordance with the second aspect of the present invention, when the emitted light outputted from the LED light source is introduced into the optical fiber with a various incident angle, a difference in length of the propagation passage through the optical fiber arises while inducing an optical phase difference during propagation of the emitted light through the optical fiber. This leads to the result that fluctuation of an optical intensity of the emitted light due to a pattern of light emission from the LED light source can be eliminated, resulting in light emission being uniformalized.

In addition, with the LED light irradiating apparatus constructed in accordance with the third aspect of the present aspect of the present invention, since the emitted light outputted from the LED light source is conducted to the light irradiating fiber through a plurality of optical fibers, the irradiated light having a desired light irradiation pattern determined depending on the positions located opposite to the outlet ends of the respective optical fibers is projected onto a screen or the like while forming a desired image thereon. When the optical fibers each having the emitted light intensely propagating therethrough and the optical fibers each having the emitted light weekly propagating therethrough are located in the side-by-side relationship at the outlet end of the optical fiber located opposite to the light irradiating lens, fluctuation of the optical intensity of the emitted light attributable to a pattern of light emission from the LED light source can be eliminated effectively.

With the LED irradiating apparatus constructed in accordance with the fourth aspect of the present invention, the emitted light from each LED light source is introduced into the inlet port of each of the optical fiber portions branched from the optical fiber and all the emitted lights are then collected at the outlet end of the optical fiber. Thus, a quantity of the emitted light at the outlet end of the optical fiber is increased substantially.

In addition, with the optical fiber constructed in accordance with the fifth aspect of the present invention, since the outlet end of the optical fiber is formed by the two inclined surfaces intersecting the optical axis of the optical fiber while exhibiting the wedge-shaped configuration, the light which has reached the outlet end of the optical fiber while repeating reflection along the whole length of the core portion of the optical fiber is irradiated from the two inclined surfaces with refraction toward the opposite inclined surface side. Thus, the lights which have been irradiated from the two inclined surfaces once intersect each other and then gradually expand as they leave the outlet end of the optical fiber, whereby they are projected toward, e.g., a reflective plate on the rear end of a motorcar running ahead of a rear motorcar located sufficiently away from the outlet end of the optical fiber with an elliptical contour which extends at a right angle relative to the two inclined surfaces.

Other objects, features and advantages of the present invention will become readily apparent from reading of the following description which has been made in conjunction with the accompanying drawings.

DESCRIPTION OF THE PREFERRED EMBODIMENTS

Figure 1:
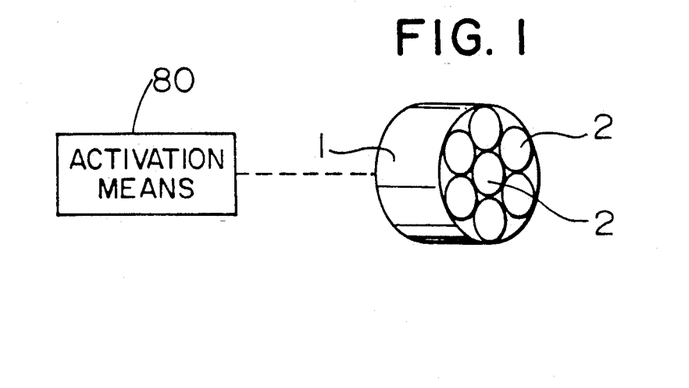
FIG. 1 is a perspective view of a light source in accordance with a first embodiment of the present invention.

FIG. 1 is a perspective view of a light source employable for an optical radar system in accordance with a first embodiment of the present invention. As shown in the drawings, the light source designated by reference numeral 1 comprises seven light emitting units 2 in such a manner that one of them is located at the central part of the light source 1 and the remaining six light emitting units 2 are circumferentially arranged around the central light emitting unit 2 in a side-by-side relationship. With the light source 1 constructed as described above, only the central light emitting unit 2 may be activated by activation means 80. Alternatively, all seven light emitting units 2 may be activated simultaneously by activation means. It should be noted that infrared ray emitting diodes or the like are employed for the light emitting units 2.

Figure 2:
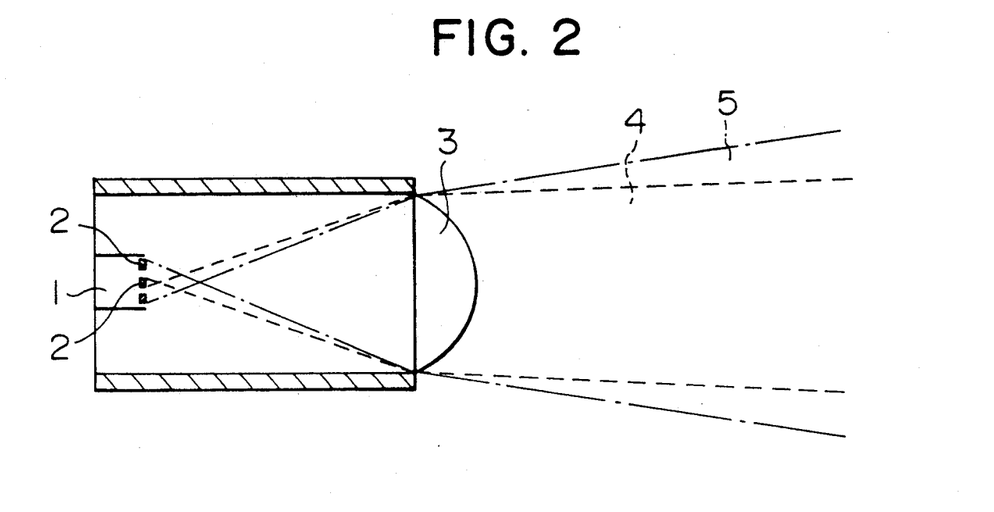
FIG. 2 is a sectional side view of a portion of an optical radar system wherein the light source shown in FIG. 1 is employed for the optical radar system.

With respect to an optical radar system as shown in FIG. 2, the light source 1 is located at the position coincident to the focus of a light irradiating lens 3, and an emitted light 4 generated when only the central light emitting unit 2 is activated becomes a narrow beam which advances from the light source 1 while gradually radially expanding after it has passed through the light irradiating lens 3 in the same manner as the conventional LED light source 1A which has been described above with reference to FIG. 16. On the other hand, an emitted light 5 generated when all seven light emitting units 2 are simultaneously activated becomes a wide beam which advances from the light source 1 while largely radially expanding after it has passed through the light irradiating lens 3, because the light emitting section has a wide working surface and a some light components are irradiated from the position comparatively largely offset from an optical axis of the light source 1.

Figure 3:
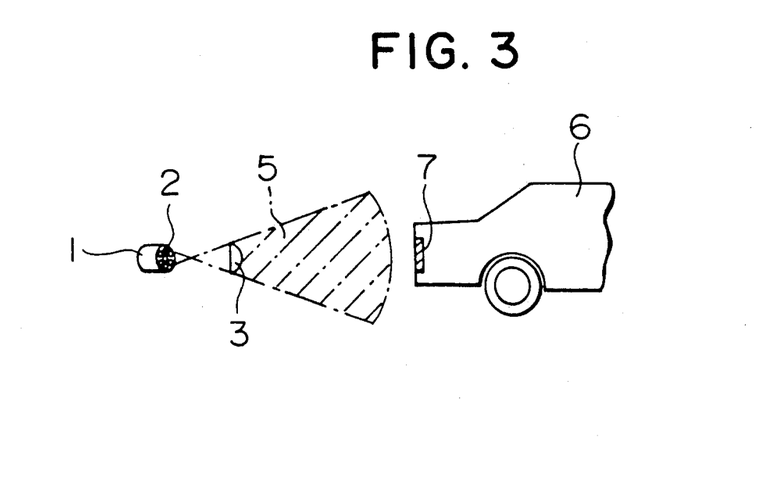
FIG. 3 schematically illustrates an advantageous effect derived from the light source shown in FIG. 1.
Figure 4:
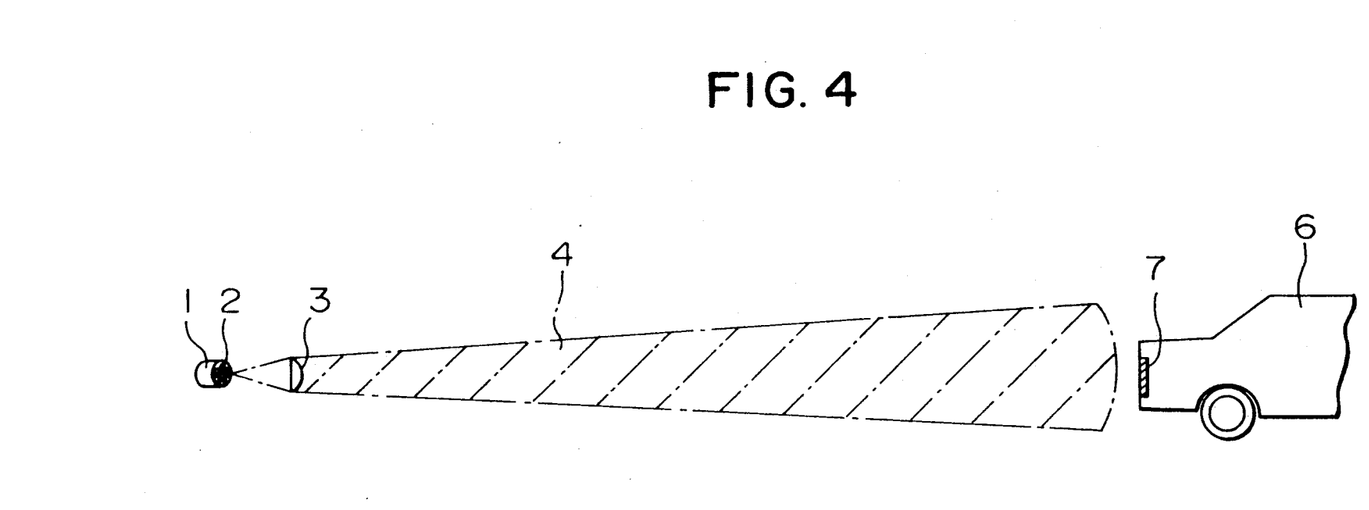
FIG. 4 schematically illustrates another advantageous effect derived from the light source shown in FIG. 1.

In a case where a distance between two motorcars, i.e., a rear motorcar (not shown) including the light source 1 and a motorcar 6 running ahead of the rear motorcar is short, e.g., 10 meters, as shown in FIG. 3, a largely radially expanding wide light 5 is emitted from the light source 1 by activating all seven light emitting units 2 so that a wide range inclusive of a reflective plate 7 mounted at the rear end of the motorcar 6 is illuminated with the wide beam. On the contrary, in a case where a distance between the two motorcars is sufficiently long as shown in FIG. 4, only the central light emitting unit 2 is activated to generate a slightly radially expanding narrow beam 4. In this case, since the narrow beam 4 has sufficiently large radial expansion until it reaches the motorcar 6 running ahead of the rear motorcar, the reflective plate 7 on the rear end of the motorcar 6 can reliably be illuminated even with the narrow beam 4.

As is apparent from the above description, when the light source 1 of the present invention is employed for an optical radar system, the motorcar 6 running ahead of the rear motorcar can reliably visually be sensed by a driver in the rear motorcar regardless of a distance between the two motorcars by properly changing the working surface of the light emitting section of the light source 1 depending on the distance between the two motorcars. In addition, if the time that elapses from the point of time when the light beam is reflected from the reflective plate 7 on the rear end of the motorcar 6 until the point of time when the reflected light returns to suitable measuring means on the rear motorcar can be measured by this measuring means, the distance between the two motorcars can be determined with high accuracy.

It should be noted that the present invention should not be limited only to the first embodiment thereof but the number of light emitting units 2 and a manner of arranging them may be determined in proper consideration of various working conditions. In addition to the case where the light source of the present invention is employed for an optical radar system as mentioned above, it may be used not only as a light source for a conventional light irradiating device or apparatus but also as a light source for a conventional lamp.

Next, a second embodiment of the present invention will be described below with reference to FIG. 5 and FIG. 6.

Figure 5:
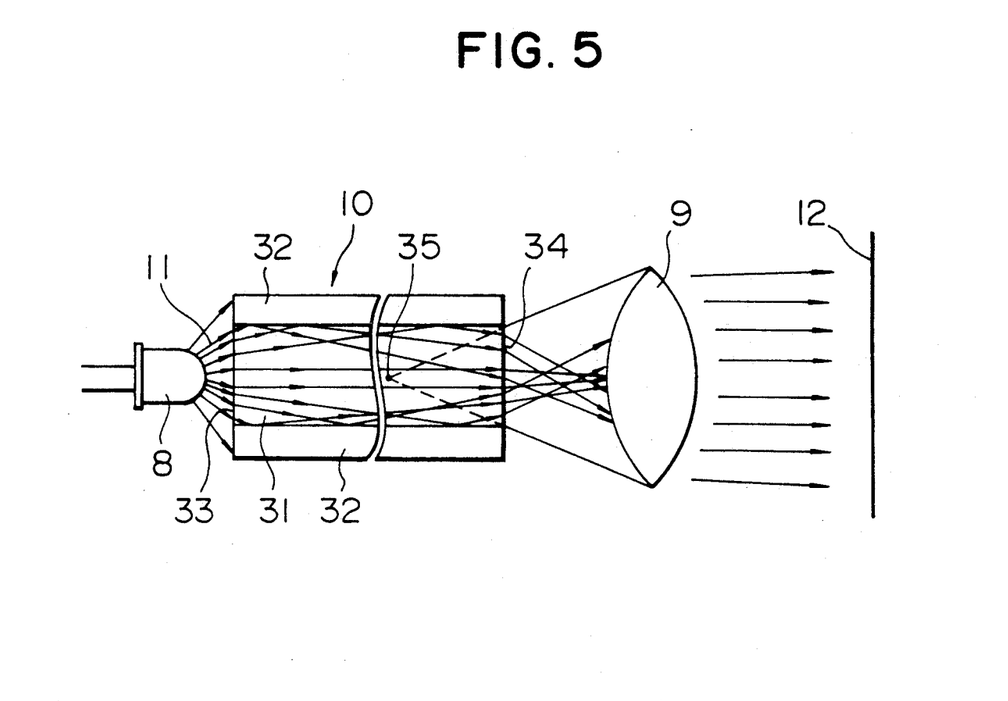
FIG. 5 is a schematic sectional side view of a light irradiating apparatus having a light emitting diode (LED) used therefor as a light source in accordance with a second embodiment of the present invention.
Figure 6:
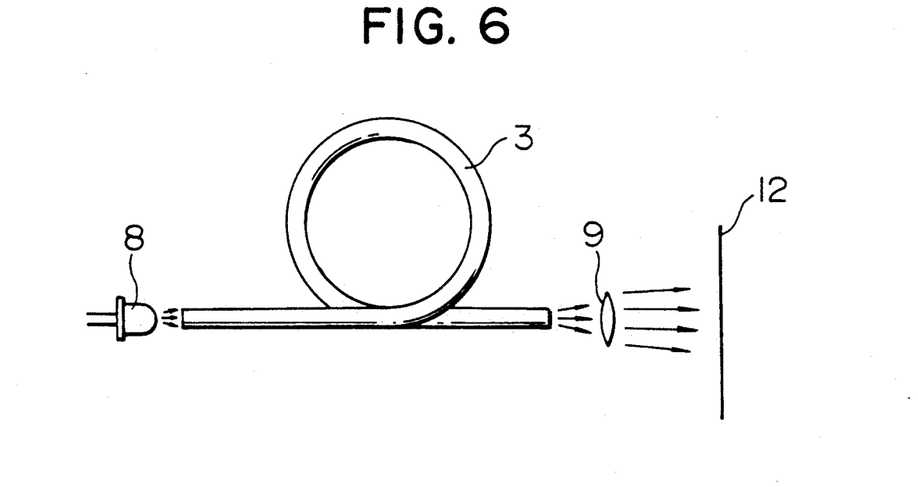
FIG. 6 is a side view of the LED light irradiating apparatus shown in FIG. 5, particularly illustrating a case where the apparatus includes long optical fibers which are circularly bent as shown.

FIG. 5 is a schematic side view of a light irradiating apparatus having a LED used therefor as a light source in accordance with the second embodiment of the present invention. As shown in the drawing, an optical fiber 10 is arranged between the LED light source 8 and a light irradiating lens 9 so that an emitted light 11 from the LED light source 8 can be conducted to the light irradiating lens 9 through the optical fiber 1.

The optical fiber 10 itself is well known by any expert in the art. Specifically, the optical fiber 10 is constituted by a core portion 31 having a relatively large refractive index and a clad portion 32 having a relatively small refractive index, and one end of the optical fiber 10 is located at the position in the vicinity of the LED light source 8, while the other end of the same is located at the position substantially coincident to the focus of the light irradiating lens 9. In FIG. 5, reference numeral 35 designates an apex of an aperture angle at an outlet port 34 of the optical fiber 10. Thus, the optical fiber 10 is arranged such that the apex 35 positionally coincides with the focus of the light irradiating lens 9.

With the LED light irradiating apparatus constructed as described above, the emitted light 11 from the working surface of the LED light source 8 is introduced into the optical fiber 10 via an inlet port 33 and then propagates to the outlet port 34 while repeatedly being reflected along the full length of the core portion 31. As the emitted light 11 is introduced into the optical fiber 10 with various incident angles, optical phase deviation occurs within the optical fiber 10 during propagation of the emitted light 11 through the optical fiber 10 due to a difference in length of a propagation passage of the emitted light 11 through the optical fiber 10. Therefore, since fluctuation in an optical intensity of the emitted light 11 at the inlet port 33 of the optical fiber 10 due to a pattern of generating the emitted light 11 at the LED light source 8 is correctly compensated at the outlet port 34 of the optical fiber 10 so that the optical intensity of the emitted light 11 is uniform at the outlet port 34 of the same, projection of the emitted light 11 onto a screen 12 or the like via the light irradiating lens 9 is accomplished with uniform distribution of the optical intensity.

It should be noted that when a multimode optical fiber including a core portion having a larger diameter is substituted for the optical fiber 10, the number of modes for propagation of the emitted light 11 can be increased, and mode joint and mode variation frequently take place among the respective modes, resulting in uniform distribution of the optical intensity of the emitted light 11 at the outlet port 34 of the optical fiber 10 being largely promoted. In addition, to assure that mode joint and mode variation more positively take place within the optical fiber 10, the optical fiber 10 may be elongated. Alternatively, the optical fiber 10 may be bent to assume a loop-shaped configuration, as shown in FIG. 6.

Next, a third embodiment of the present invention will be described below with reference to FIG. 7.

Figure 7:
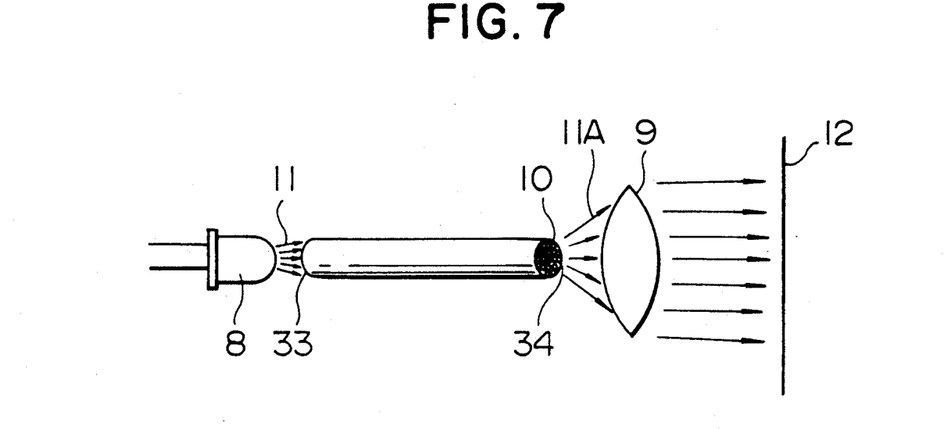
FIG. 7 is a schematic side view of a LED light irradiating apparatus in accordance with a third embodiment of the present invention.

FIG. 7 is a schematic side view of a LED light irradiating apparatus in accordance with the third embodiment of the present invention. A bundle of optical fibers 110 is arranged between a LED light source 8 and a light irradiating lens 9 so that an emitted light 11 from the LED light source 8 can be conducted to the light irradiating lens 9 through the optical fibers 110. Each optical fiber 110 comprises is constituted by a core portion having a relatively large refractive index and a clad portion having a relatively smaller refractive index, and one end of each optical fiber 110 is located opposite to a light emitting section of the LED light source 8 to serve as an inlet port 133, while other end of the same is located at the position substantially coincident with the focus of a light irradiating lens 9 to serve as an outlet port 134. In addition, the central part of the bundled optical fibers 110 at their outlet ports 134 is located at the position coincident with the focus of the light irradiating lens 9.

With the LED light irradiating apparatus constructed as described above, an emitted light 11 from the LED light source 8 is introduced into the bundled optical fibers 110 via their inlet ports 133 located opposite to the LED light source 8 and then propagates while being repeatedly reflected along the full length of each core portion until it reaches the outlet ports 134. Since the central part of the bundled optical fibers 110 at their outlet ports 134 is located at the position coincident with the focus of the light irradiating lens 9, the light 11A irradiated from the outlet ports 134 of the optical fibers 110 is transformed into a parallel light while propagating through the light irradiating lens 9 so that the parallel light is projected onto a screen 12 or the like.

Since the emitted light 11 is introduced into each optical fiber 110 at various incident angles, a difference in a length of each propagation passage of the emitted light 11 arises until it reaches the outlet ports 134, and moreover, optical phase deviation of the emitted light 11 occurs within the optical fiber 110 during propagation of the emitted light 11 through the optical fibers 110. Thus, a difference in optical intensity of the emitted light 11 attributable to a pattern of generating the emitted light 11 at the LED light source 8 is correctly compensated at the outlet ports 134, whereby the irradiated light 11A is projected onto the screen 12 or the like via the light irradiating lens 9 with uniform distribution of an optical intensity.

Next, a fourth embodiment of the present invention will be described below with reference to FIG. 8.

Figure 8:
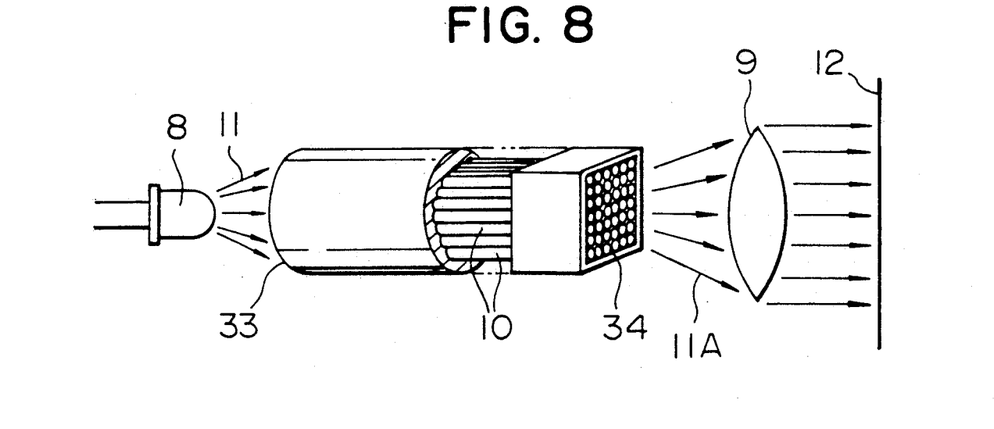
FIG. 8 is a schematic side view of a LED light irradiating apparatus in accordance with a fourth embodiment of the present invention.

FIG. 8 is a schematic side view of a LED light irradiating apparatus in accordance with the fourth embodiment of the present invention, particularly illustrating by way example that a number of optical fibers 210 are arranged in a laminated structure without an occurrence of an intersection with the optical fibers 210 between inlet ports 233 and outlet ports 234 thereof. Since the whole of the outlet ports 234 located opposite to a light irradiating lens 9 exhibit a square contour, an irradiated light 11A is projected onto a screen 12 or the like with an image similar to a square.

Next, a fifth embodiment of the present invention will be described below with reference to FIG. 9.

Figure 9:
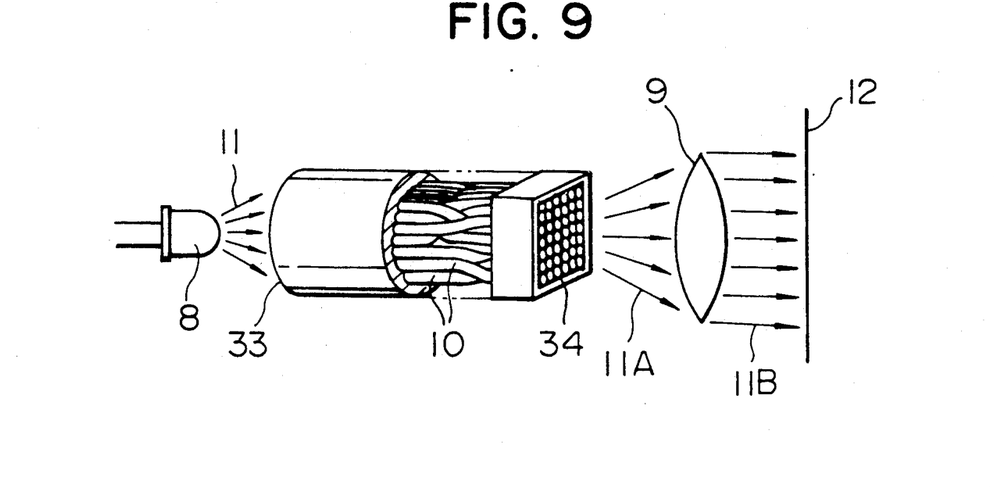
FIG. 9 is a schematic side view of a LED light irradiating apparatus in accordance with a fifth embodiment of the present invention.

FIG. 9 is a schematic side view of a LED light irradiating apparatus in accordance with the fifth embodiment of the present invention, particularly illustrating by way of example that a number of optical fibers 310 are arranged in an eddy current-shaped configuration in accordance with a predetermined order with an occurrence of intersections with the optical fibers 310 between inlet ports 333 and outlet ports 334 thereof. When the optical fibers 10 intersect each other between the inlet ports 333 and the outlet ports 334 in the above-described manner, an emitted light 11 from an intense light emitting portion in a LED light source 8 and an emitted light 11 from a weak light emitting portion in the same are located adjacent to each other at the outlet ports 334. This makes it possible to more effectively eliminate fluctuation in distribution of an optical intensity attributable to a pattern of generating the emitted light 11 in the LED light source 8.

In this embodiment, the outlet ports 334 of the bundled optical fibers 310 located opposite to the light irradiating lens 9 exhibits a square contour. Alternatively, the contour of the outlet ports 334 may be circular, rectangular, elliptical, triangular or rhombic so that an image having a desired contour can be projected on a screen 12.

Next, a sixth embodiment of the present invention will be described below with reference to FIG. 10.

Figure 10:
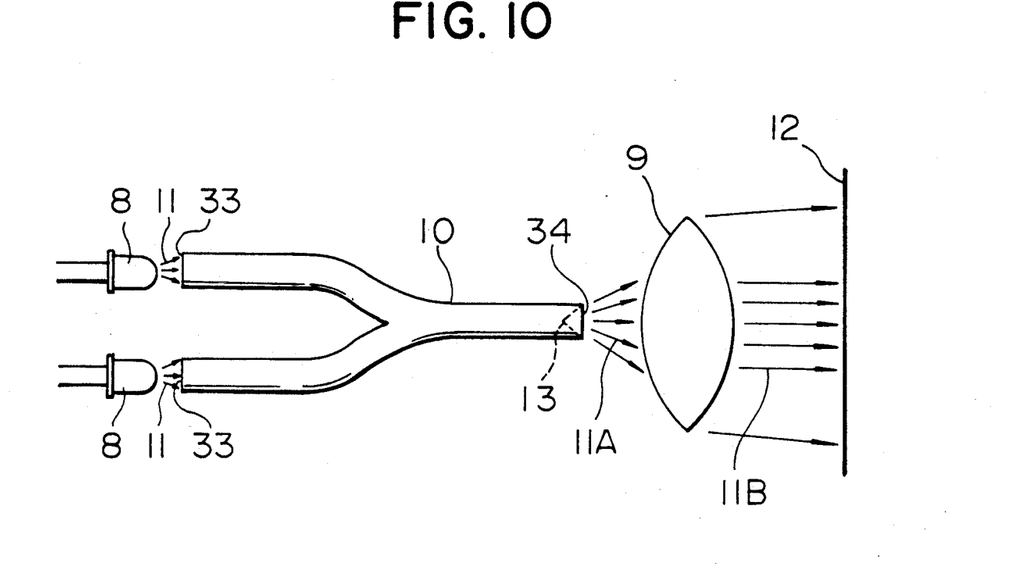
FIG. 10 is a schematic side view of a LED light irradiating apparatus in accordance with a sixth embodiment of the present invention.

FIG. 10 is a schematic side view of a LED light irradiating apparatus in accordance with the sixth embodiment of the present invention, particularly illustrating an arrangement of an optical fiber including a fusible type optical coupler. The left-hand end of the optical fiber 410 is bifurcated into two parts to form two inlet ports 433, and an outlet port 434 is formed at the right-hand end of the optical fiber 410 as seen in the drawing. Two LED light sources 8 are located opposite to the inlet ports 433 of the optical fiber 410 and a light irradiating lens 9 is located opposite to the outlet port 434 of the same so that an emitted light 11 from the LED light sources 8 is conducted to the light irradiating lens 9 via the outlet port 434 of the optical fiber 410. The apex 13 of an aperture angle defined at the outlet port 434 of the optical fiber 410 is located at the position coincident with the focus of the light irradiating lens 9.

With the LED light irradiating apparatus constructed as described above, emitted lights 11 outputted from the LED light sources 8 are introduced into the interior of the optical fiber 410 via the two inlet ports 433 and then propagate through the optical fiber 410 to reach the outlet port 434 via the optical coupler disposed midway along the optical fiber 410 while being repeatedly reflected along the full length of each core portion (not shown) having a relatively large refractive index.

Thereafter, an irradiated light 11A is outputted from the single outlet port 434 of the optical fiber 410.

For example, it is assumed that the two LED light sources 8 have a same light emission power and a transmission loss caused until the emitted lights 11 reach the outlet port 434 of the optical fiber 410 is less than 3 db. In this case, a quantity of the irradiated light 11A at the outlet port 434 of the optical fiber 410 increases much more than in the case where a single LED light source 8 is used for the LED irradiating apparatus. This is attributable to the fact that an optical fiber made of quartz normally has a transmission loss of about 0.5 db/km and a transmission loss appearing at the location where two lights are coupled to each other is normally about 1.5 db.

Since the emitted lights 11 are introduced into the optical fiber 410 with various angles, there arises a difference in length of the propagation passage until the emitted lights 11 reach the outlet port 434 of the optical fiber 410, causing optical phase deviation to occur within the optical fiber 410 during propagation of the emitted lights 11 along the optical fiber 410. Thus, fluctuation in distribution of an optical intensity of the emitted lights 11 attributable to a pattern of generating them at the LED light sources 8 is eliminated. In addition, a difference in optical intensity of the emitted lights 11 attributable to a pattern of generating them at a plurality of LED light sources 8 is eliminated by optical coupling of the emitted lights 11 outputted from the LED light sources 8. As a result, an irradiated light 11B is projected onto a screen 12 or the like via the light irradiating lens 9 with uniform optical intensity.

Since the outlet port 434 of the optical fiber 410 is located at the position substantially coincident with the focus of the light irradiating lens 9, the irradiated light 11A is transformed via the light irradiating lens 9 into a substantially parallel light 11B which in turn is projected onto the screen 12 or the like.

Figure 11:
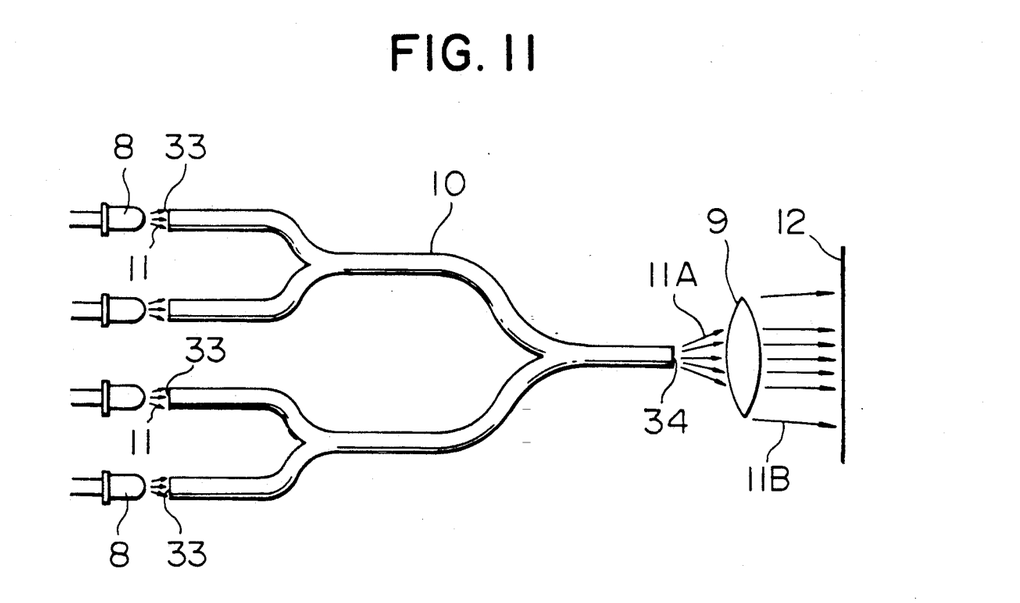
FIG. 11 is a schematic side view of a LED light irradiating apparatus in accordance with a modified embodiment of the present invention.
Figure 12:
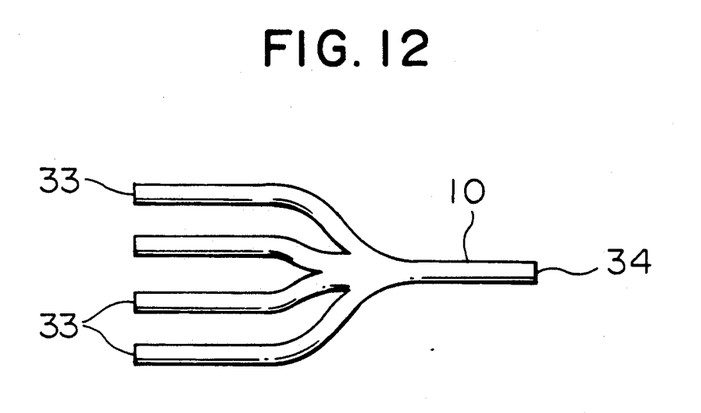
FIG. 12 is a schematic side view of a LED light irradiating apparatus in accordance with another modified embodiment of the present invention.

In the embodiment shown in FIG. 10, the optical fiber 410 includes two inlet ports 423. Alternately, the optical fiber 410 may be subjected to plural bifurcating (for example twice bifurcating as shown by optical fiber 410' in the modified embodiment shown in FIG. 11). Additionally, as shown in FIG. 12, the optical fiber 510 may be divided into three or more sections on the inlet port 533 side, and have one outlet port 534.

The optical coupler should not be limited only to the fusible type but a bulk type may be employed for the optical coupler.

Next, a seventh embodiment of the present invention will be described below with reference to FIG. 13.

Figure 13:
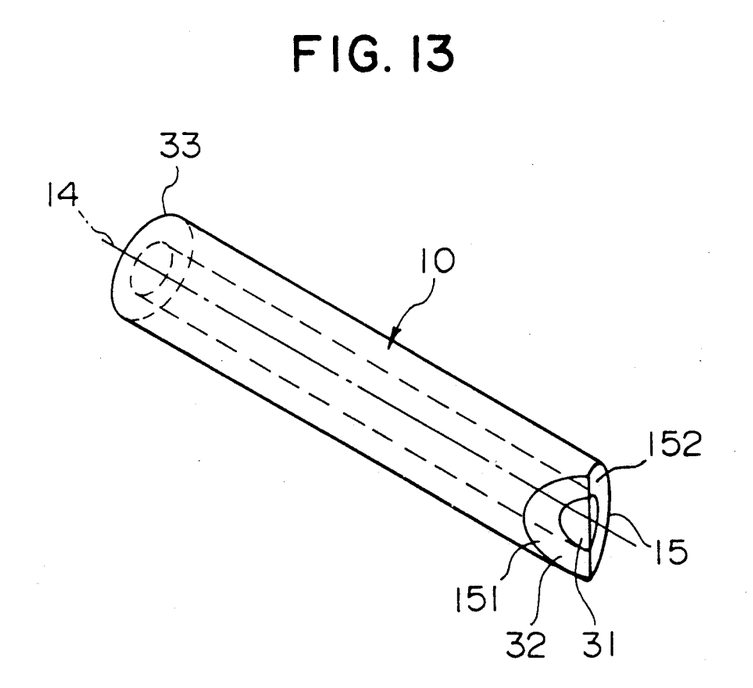
FIG. 13 is a perspective view of an optical fiber in accordance with a seventh embodiment of the present invention.

FIG. 13 is a perspective view of an optical fiber in accordance with the seventh embodiment of the present invention. The optical fiber designated by reference numeral 10 includes a core portion 31 having a relatively large refractive index and a peripheral clad portion 32 having a relatively small refractive index. An inlet end 33 of the optical fiber 10 is formed at a right angle relative to an optical axis 14 of the optical fiber 10 and an outlet end 32 of the same is formed by two inclined surfaces 151 and 152 intersecting each other symmetrically relative to the optical axis 14 of the optical fiber 10 while exhibiting a wedge-shaped configuration.

Figure 14:
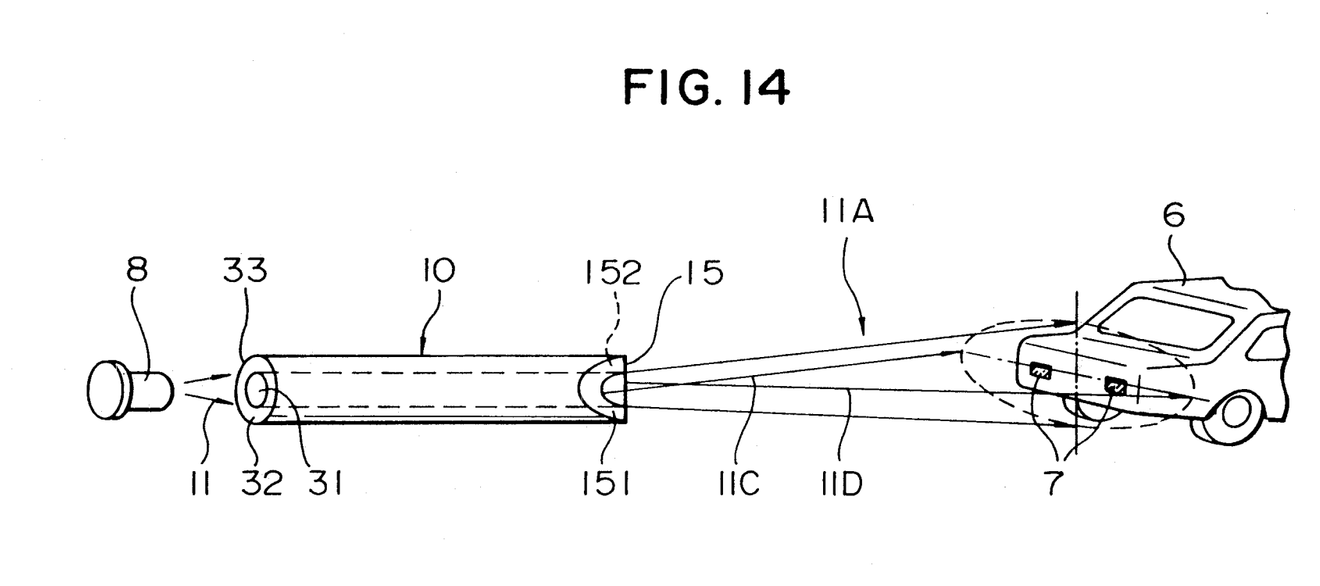
FIG. 14 is a schematic side view of an optical radar system for which the optical fiber shown in FIG. 13 is used.

With the optical fiber 10 constructed as described above, when the optical axis 14 of the optical fiber 10 is laid in the horizontal direction with the inclined surfaces 151 and 152 intersecting each other at a right angle and a LED light source 8 is disposed opposite to the inlet end 33 of the optical fiber so that an emitted light 11 from the LED light source 8 is introduced into the core portion 31 as shown in FIG. 14, the emitted light 11 propagates through the optical fiber 10 to reach the outlet end 15 of the same, whereby it is irradiated toward a reflective plate 7 on the rear end of a motorcar 6.

A light irradiation angle at the outlet end 15 of the optical fiber 10 is determined not only by the refractive index of the core portion 31 and the refractive index of the clad portion 32 of the optical fiber 10, but also on an intersection angle of the emitted light 11 relative to the optical axis 14 during propagation of the emitted light 11 through the optical fiber 10. When only a light component propagating in parallel with the optical axis 14 through the optical fiber 10 is considered for the purpose of simplification of understanding, the light component is irradiated from the outlet end 15 without refraction in the upward/downward direction, because the inclined surfaces 151 and 152 extend in the vertical direction. However, a light 11C irradiated from the inclined surface 151 is refracted toward the inclined surface 152 side and a light 11D irradiated from the inclined surface 152 is refracted toward the inclined surface 151 side, because the inclined surfaces 151 and 152 are arranged symmetrically relative to the optical axis 14 in the wedge-shaped configuration. Thus, both the lights 11C and 11D irradiated from the inclined surfaces 151 and 152 once intersect each other at the position located in the vicinity of the outlet end 15, and thereafter, as they leave the outlet end 15, they increasingly expand in the leftward/rightward direction. Thus, the light 11A irradiated from the outer end 15 of the optical fiber 10 is projected onto a reflective plate 7 on the rear end of a motorcar 6 within the illuminating region having a transversely elongated elliptical contour.

The light 11 introduced into the optical fiber 10 from the light source 8 includes not only a light component introduced into the inlet end 33 at a right angle and then propagating through the core portion 31 of the optical fiber 10 in parallel with the optical axis 14 to reach the outlet end 15 of the same, but also a light component introduced into the inlet end 33 at a certain angle and then propagating therethrough to reach the outlet end 15 while being repeatedly reflected along the boundary surface between the core portion 31 and the clad portion 32. For this reason, an irradiation angle of the light 11 practically irradiated from the outlet end 15 of the optical fiber 10 is enlarged in every direction much more than the above-considered case. At any rate, however, since the light 11 is irradiated from the outlet end 15 of the optical fiber 10 in the transversely elongated elliptical configuration, the reflective plate 7 on the motorcar 6 running ahead of the, rear motorcar (not shown) can be illuminated at a high optical efficiency.

As is apparent from the above description, when the optical fibers of the present invention are used as light irradiating means for an optical radar system, the light irradiated from the optical fiber can illuminate the reflective plate 7 on the motorcar 6 with a sufficient quantity of light while exhibiting minimized unnecessary expansion in the upward/downward direction but effective expansion in the horizontal direction, resulting in the reflective plate 7 on the rear end of the motorcar 6 being easily visually recognized by a driver of the rear motorcar. In addition, a distance between the motorcars 6 can be measured with excellent efficiency by measuring the time that elapses until the reflected light returns to the rear motorcar, by using suitable counting means.

Of course, the optical fiber of the present invention may be bent at a certain intermediate position thereof. In addition, the optical fiber of the present invention can be used not only as light irradiating means for an optical radar system but also as a general light irradiating means. It is obvious that a light irradiating lens may be disposed opposite to the outlet end of the optical fiber.

As will be apparent from the above description, when the light source of the present invention is used as a light source for an optical radar system, a motorcar running ahead of a rear motorcar can reliably visually be recognized by a driver of the rear motorcar even when a distance between the motorcars is short. In a case where the distance between both the motorcars is long, only a light emitting unit located at the central part of the light source is required to be activated, resulting in an energy efficiency being improved substantially.

In addition, with the LED light irradiating apparatus of the present invention, distribution of an optical intensity of the light propagating through an optical fiber can be uniform by mode junction and/or mode variation of the optical fiber much more than in a case where no optical fiber is used. Since an irradiation angle of the light irradiated from the optical fiber is determined depending on the number of apertures and an aperture angle preset by the refractive index of a core portion of the optical fiber and the refractive index of a clad portion of the same, and moreover, the irradiation angle is hardly affected by an angle of emission of a light from each LED light source, a light irradiation lens system for projecting irradiated lights in parallel with each other can be designed and constructed in a simplified manner. Another advantageous effect of the present invention is that the positional relationship between the light source and the light irradiating lens can be determined with a high degree of freedom.

While the present invention has been described above with respect to several preferred embodiments thereof, it should of course be understood that the present invention should not be limited only to these embodiments but various changes or modifications may be made without departure from the scope of the present invention as defined by the appended claims.

What is claimed:

1. A light source for illuminating an object with a light beam of selected divergence angle, the light source comprising:

a lens;

a plurality of light emitting units arranged in a given array, said light emitting units being arranged opposite to said lens such that a light beam having a divergence angle is output from said lens upon activation of said light emitting units; and means for varying the divergence angle of said light beam which is output from said lens, said means for varying including activation means for simultaneously activating a selected number of said light emitting units said selected number including less than all of said light emitting units, so that light emission from less than all of said light emitting units can be changed to light emission from all of said light emitting units, and vice versa to selectively change the divergence angle of the light beam output from said lens; whereby said light emission from less than all of said light emitting units produces a given light beam output from said lens having a given divergence angle at an output side of said lens, and light emission from all of said light emitting units produces a light beam output from said lens having a wider divergence angle than that of said given light beam.

2. The light source of claim 1, wherein said light emitting units each comprise a light emitting diode.

3. The light source of claim 2, wherein said light emitting diodes are arranged with a central light emitting diode and a plurality of additional light emitting diodes surrounding said central light emitting diode.

4. The light source of claim 1, wherein said given array is a circular array.

5. The light source of claim 3, wherein said given array is a circular array.

6. The light source of claim 5, wherein said additional light emitting diodes are six in number.

* * * * *